US005769912A

United States Patent [19]
Mansur

[11] Patent Number: 5,769,912
[45] Date of Patent: Jun. 23, 1998

[54] SYSTEM AND METHOD OF VAPOR RECOVERY IN INDUSTRIAL WASHING EQUIPMENT

[75] Inventor: Pierre G. Mansur, Miami, Fla.

[73] Assignee: Mansur Industries Inc., Miami, Fla.

[21] Appl. No.: 732,971

[22] Filed: Oct. 16, 1996

Related U.S. Application Data

[60] Provisional application No. 60/005,462 Oct. 16, 1995.

[51] Int. Cl.[6] .............................. B01D 45/08; B03B 3/02
[52] U.S. Cl. ........................... 55/269; 55/385.1; 55/437; 55/465; 55/471; 55/DIG. 18; 134/12; 134/21; 134/31; 134/107; 134/111
[58] Field of Search .................................. 55/385.1, 437, 55/439, 462, 465, 467, 471, DIG. 18, 267–269; 95/267, 268, 270, 288; 134/10–12, 21, 31, 104.2, 105, 107–111

[56] References Cited

U.S. PATENT DOCUMENTS

| | | | |
|---|---|---|---|
| 1,880,665 | 10/1932 | Barker | 55/385.1 X |
| 3,078,701 | 2/1963 | Rand | 134/11 X |
| 3,728,866 | 4/1973 | Layton | 55/467 X |
| 3,923,480 | 12/1975 | Visch | 55/465 X |
| 4,045,174 | 8/1977 | Führing et al. | 134/10 X |
| 4,050,367 | 9/1977 | Eakes | 55/DIG. 18 |
| 4,050,368 | 9/1977 | Eakes | 55/DIG. 18 |
| 4,101,340 | 7/1978 | Rand | 134/105 X |
| 4,505,284 | 3/1985 | Kyatt | 134/104.2 |
| 4,561,903 | 12/1985 | Blaul | 55/385.1 X |
| 4,666,473 | 5/1987 | Gerdau | 55/465 X |
| 4,690,759 | 9/1987 | Mandy | 55/471 X |
| 4,844,743 | 7/1989 | Koblenzer et al. | 134/10 X |
| 4,957,520 | 9/1990 | Parmentier et al. | 55/467 X |
| 4,983,223 | 1/1991 | Gessner | 134/105 X |
| 5,169,454 | 12/1992 | Weil | 134/10 |
| 5,201,331 | 4/1993 | Tapper | 134/104.2 |
| 5,238,468 | 8/1993 | Gabryszewski et al. | 95/267 |
| 5,240,507 | 8/1993 | Gray et al. | 134/11 X |
| 5,378,354 | 1/1995 | Poor | 55/465 X |
| 5,388,601 | 2/1995 | Mansur | 134/105 X |
| 5,565,070 | 10/1996 | Doi et al. | 134/11 X |

FOREIGN PATENT DOCUMENTS

| | | | |
|---|---|---|---|
| 3735106 | 4/1989 | Germany | 95/268 |
| 02-004402 | 1/1990 | Japan | 95/288 |
| 04-016211 | 1/1992 | Japan | 55/465 |

*Primary Examiner*—Robert Spitzer
*Attorney, Agent, or Firm*—Robert M. Downey, P.A.

[57] ABSTRACT

A system and method for recovering vapors in industrial washing equipment, wherein a solvent is used to wash various articles within a wash area of the equipment. The system includes a hood supported above the wash area, a motor driven fan mounted within the hood for creating an envelope of negative pressure between the wash area and the hood to draw rising vapors into the hood and to direct the vapors at high velocity against a surface to cause separation of pure solvent liquid droplets from the vapor through impaction, and a coalescer for gathering the separated droplets of pure solvent prior to directing the pure solvent to a holding tank for reuse in washing operations.

9 Claims, 3 Drawing Sheets

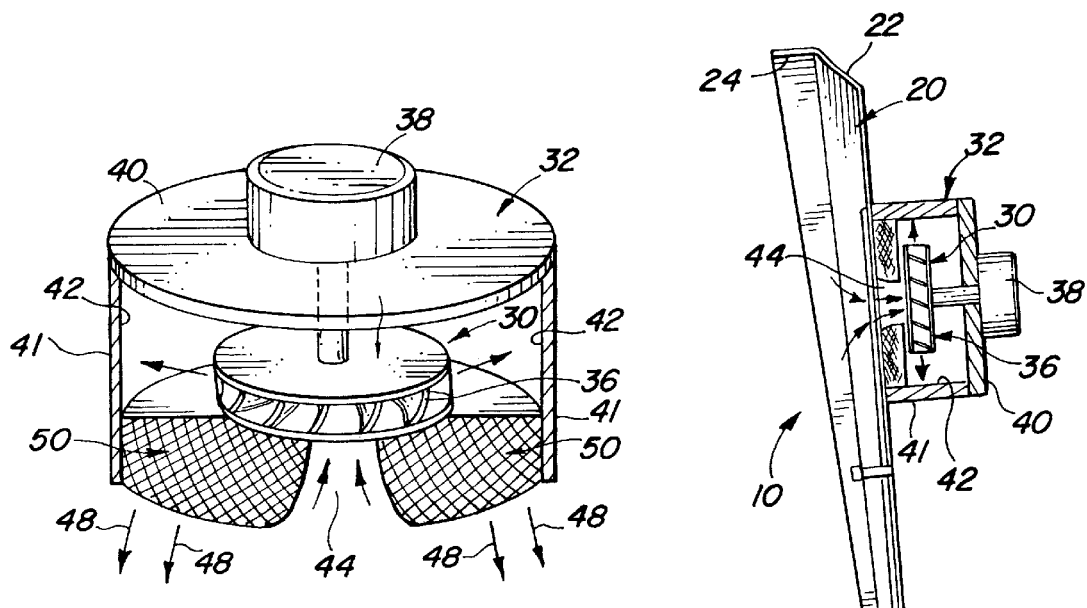
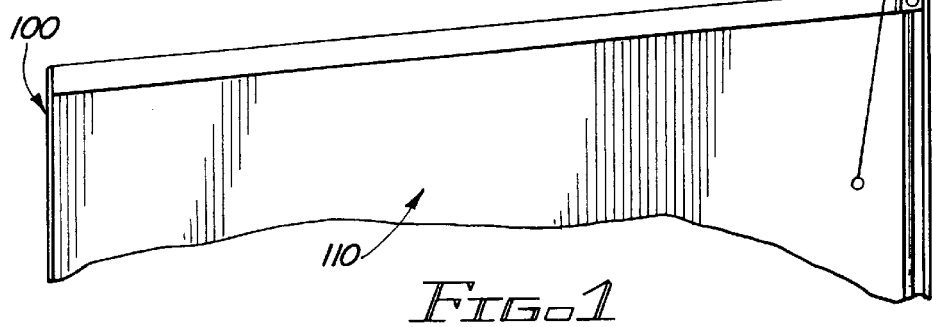
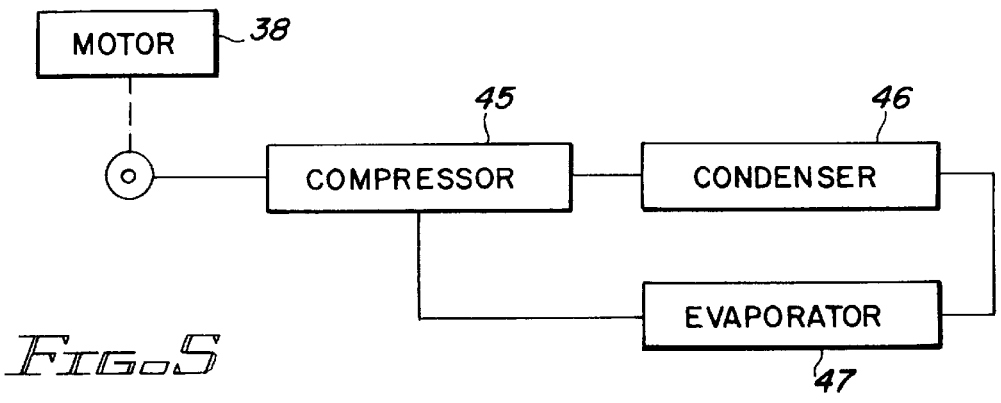

SYSTEM AND METHOD OF VAPOR RECOVERY IN INDUSTRIAL WASHING EQUIPMENT

BACKGROUND OF THE INVENTION

This application is based on a previously filed provisional patent application, filed on Oct. 16, 1995, Ser. No. 60/005, 462.

1. Field of the Invention

The present invention relates to industrial washing apparatus, and more specifically, to a system for recovering vapors in industrial washing equipment, wherein a solvent is used to clean various articles in a wash basin, sink, or like area.

2. Description of the Related Art

Solvents are used in many industries throughout the world to clean a variety of articles including engine parts, machine parts, paint spraying equipment and the like. Often, solvents are used in a washing apparatus which is specifically adapted to perform cleaning of articles within a sink, basin, or other washing area of the equipment.

Presently, there are nearly two million parts washing machines used daily in the U.S. alone. Many of these machines are provided with a sink or wash basin into which solvent is released from a spout or hose to wash the articles therein. As solvent is sprayed onto the articles being cleaned, and into the sink, vapors are continuously released, resulting in a loss of solvent. In fact, it is estimated that the use of solvents in parts cleaning operations throughout the U.S. results in thousands, and possibly millions of gallons of solvent being lost per year due to evaporation.

Accordingly, there is a need in the industrial parts cleaning industry for a system specifically adapted to recover vapors prior to escaping from the wash area in which solvents are used for cleaning various articles.

SUMMARY OF THE INVENTION

A system and method for recovering vapors in industrial washing equipment, wherein a solvent is used to wash various articles within a wash area of the equipment. The system includes a hood supported above the wash area and a motor driven fan mounted within the hood for creating an envelope of negative pressure between the wash area and the hood to draw rising vapors into the hood. As the vapors are drawn into the hood, the fan further acts to throw the vapors tangentially outward, by centrifugal force. The vapors are directed, at high velocity, onto a surface, causing separation of pure solvent liquid droplets from the vapor through impaction. Thereafter, a coalescer gathers the separated droplets prior to directing the pure solvent to a holding tank for reuse in washing operations.

With the foregoing in mind, it is a primary object of the present invention to provide a system and method for the integrated recovery of volatile solvent vapors in industrial washing equipment to thereby prevent the vapors from escaping into the atmosphere.

It is a further object of the present invention to provide a system and method for recovering volatile solvent vapors in industrial washing equipment prior to escaping to the atmosphere, wherein the recovered vapors are thereafter converted to pure solvent for reuse in washing operations.

It is still a further object of the present invention to provide a system and method for recovering volatile solvent vapors prior to escaping to atmosphere, thereby substantially minimizing harm to the environment.

It is still a further object of the present invention to provide a system and method for recovering solvent vapors in industrial washing equipment and for subsequently converting the recovered vapors to liquid solvent, to thereby substantially minimize loss of solvent during washing operations.

These and other objects and advantages of the present invention will be more readily apparent in the description which follows:

BRIEF DESCRIPTION OF THE DRAWINGS

For a fuller understanding of the nature of the present invention, reference should be had to the following detailed description taken in connection with the accompanying drawings, in which:

FIG. 1 is an isolated side elevation, shown in partial section, illustrating the component elements of the system of the present invention;

FIG. 3 is a perspective view, in partial section, illustrating an assembly of the system for drawing vapors therein and converting the vapors to a liquid state;

FIG. 5 is a schematic illustration of a cooling system which may be used in the system of the present invention.

DETAILED DESCRIPTION OF THE PREFERRED EMBODIMENTS

Figure 2:
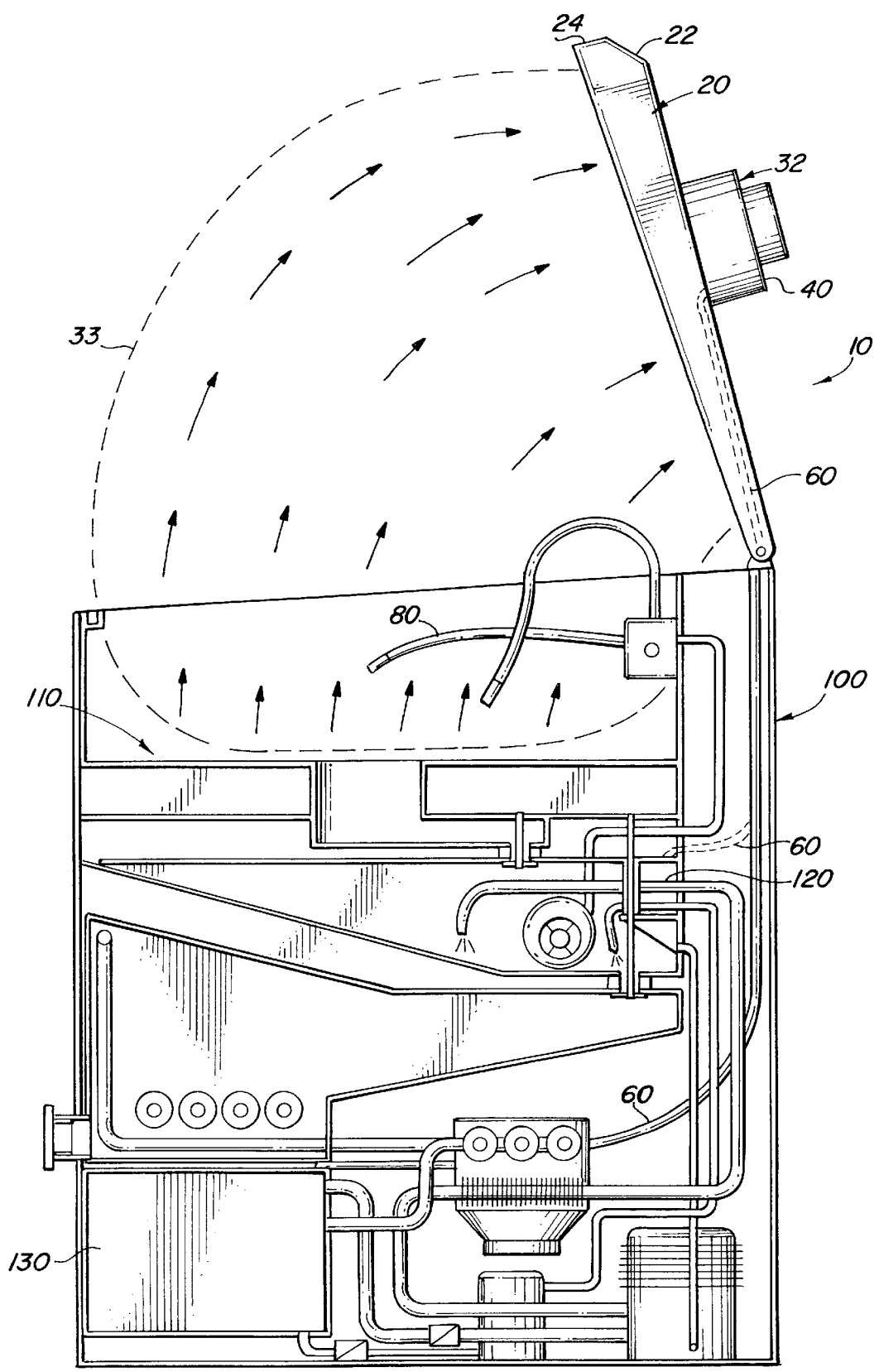
FIG. 2 is a side elevation, in partial section, illustrating the system of the present invention used in connection with an industrial parts washing apparatus.
Figure 4:
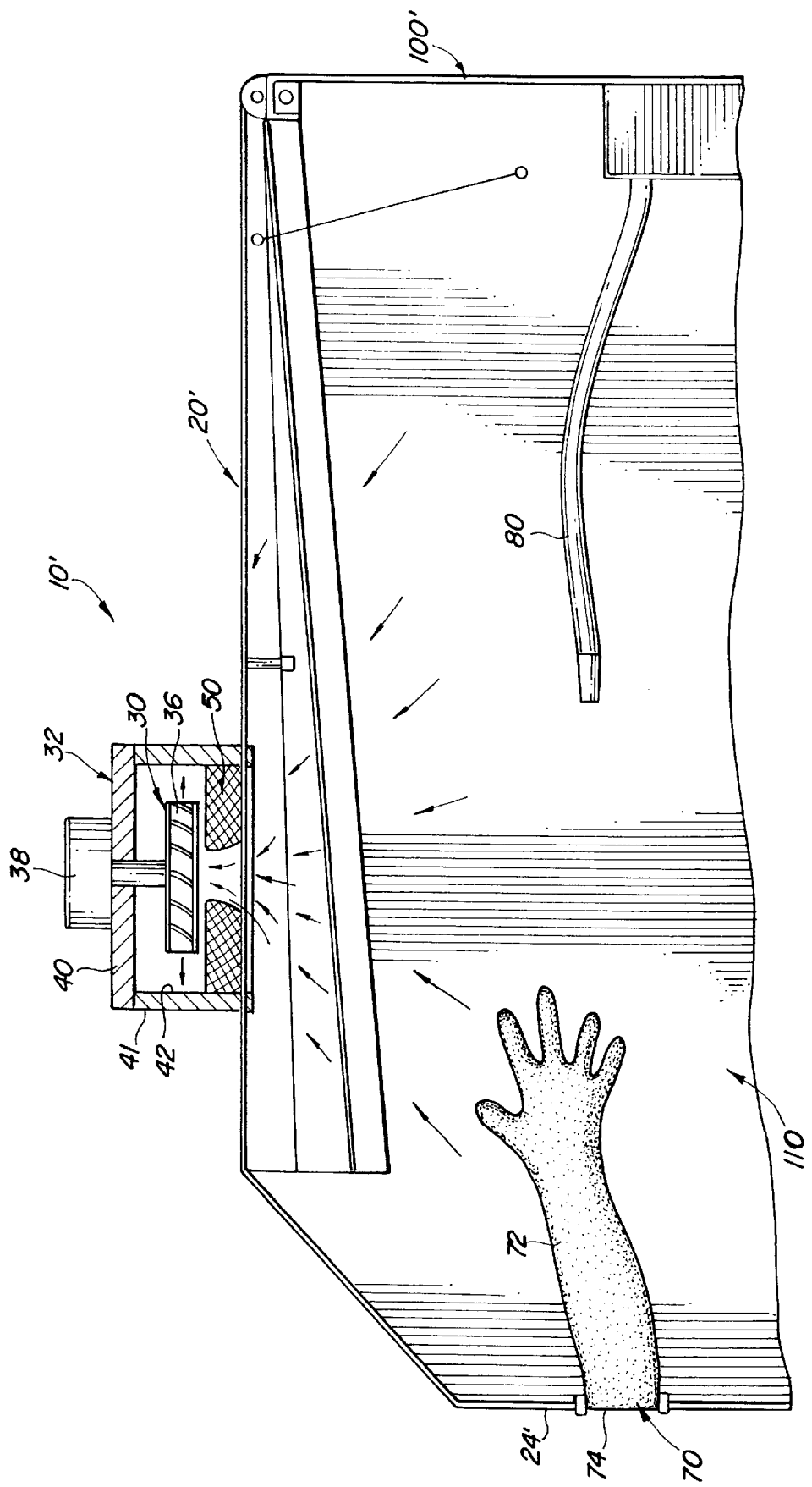
FIG. 4 is an isolated side elevation, in partial section, illustrating an alternative embodiment of the system of FIGS. 1 and 2, wherein the hood is maintained in a closed position.

Referring initially to FIGS. 1–3, there is shown a first preferred embodiment of the present invention directed to a system 10 for recovering vapors in an industrial washing apparatus 100. Specifically, the system 10 of the present invention is designed to minimize the amount of vapors escaping to atmosphere from a wash area 110 of the apparatus 100. The system 10 is further structured to convert the collected vapors to a liquid state, thereby yielding pure solvent for subsequent use during washing operations in the apparatus 100.

As seen in FIGS. 1 and 2, the system 10 includes a hood structure 20 which is hingedly mounted to the apparatus 100 so as to be movable between an open position during washing operations, as seen in FIG. 2, and a closed position to cover the wash area 110 during periods of non-use of the apparatus 100. The hood 20 includes a distal end zone 22 including an extending portion 24 defining a scoop. The scoop is structured and disposed to be positioned substantially above the wash area 110 when the hood 20 is in the open position, as seen in FIG. 2.

A unit 32 mounted to the hood 20 includes fan means 30 therein for creating an envelope of negative pressure above the wash area 110. The negative pressure envelope is indicated by the broken line 33 in FIG. 2. In a preferred embodiment, the fan means 30 is defined by an impeller 36 driven by a motor 38. The motor 38 may be either air operated or electrically operated. It is preferable that the fan means 30 have a capacity of approximately 1,000 cfm. The motor 38 is mounted to a top of a housing 40 having an outer wall 41 and an inner cylindrical side wall 42 which substantially surrounds the impeller 36. The housing 40 can be mounted to the hood 20 or, alternatively, built into the hood.

The motor 38 may also be used to operate a cooling system to cool the surrounding cylindrical wall 42. In one embodiment, the cooling system, using a refrigerant such as freon, includes a rotary compressor 45 driven by the motor 38, together with a condenser 46 and an evaporator 47, as shown in FIG. 5. The compressor 45 and condenser 46 of the cooling system may be housed within the motor housing 38. The evaporator 47 of the cooling system is defined within the space between the cylindrical wall 42 and outer wall 41, and serves to cool the wall 42 during operation of the unit 32.

In operation, the impeller 36 is driven by the motor 38 to draw air through the central zone 44, thereby creating the envelope of negative pressure 33 above the wash area 110. As vapors rise from the wash area, they are drawn towards the scoop and inner face of the hood 20, and subsequently through the central zone 44 of the fan means 30. The vapors are thereafter thrown tangentially outward of the impeller 36 by centrifugal force towards the inner surrounding surface of the cylindrical wall 42 or another surface, as indicated by the arrows in FIGS. 1 and 3. The force of impact of the vapors hitting the surface of the wall 42 and the radical change in direction of air flow (downward) causes small droplets of liquid to be separated from the air of the vapors. The separated air is then exhausted through the bottom of the unit, as indicated by the arrows 48 in FIG. 3. The temperature of the wall 42 can be cooled by the cooling system, if needed, to further induce separation of liquid from the vapors, by condensation. Small droplets of pure solvent which form on the inner surface of the wall 42 or another surface, as a result of impaction and/or condensation, run downwardly to a coalescing means 50. The coalescing means 50 gathers the small droplets as they move towards a bottom of the unit 32. The gathered pure liquid solvent is thereafter directed to the wash area 110 or, alternatively, to a primary solvent holding tank 120 and/or a secondary clean solvent holding tank 130 via a return conduit 60.

In another embodiment of the system 10', as seen in FIG. 2, the hood 20' is maintained in a closed position over the wash area 110 of apparatus 100' during washing operations. In this particular embodiment, means 70 are provided for access to articles being washed in the wash area 110. In one embodiment, the access means 70 may include rubber gloves 72 fitted to an access opening 74 on the distal end 24' of the hood 20'. The rubber gloves 72 extend within the wash area 110 to reach and manipulate articles therein so that they may be held, rinsed with solvent, and scrubbed during the process of cleaning. In this particular embodiment, vapors rising from the wash area 110 are drawn through a portion of the hood 20' by the fan means 30 in the unit 32. The vapors are converted to a liquid state within the unit 32, in the same manner as described above in connection with the embodiment of FIGS. 1 and 2. A vacuum pump may further be employed, in combination with the components of the unit 32, in order to create a negative pressure under the hood 20', thereby inducing evaporation of the cleaning solution vapors and, accordingly, drying of the various articles being cleaned under the hood 20'. After coalescing in the unit 32, the pure solvent can be directed back into the wash area 110 or, alternatively, to the holding tanks of the apparatus 100' in much the same manner as described in connection with the embodiment of FIG. 2.

In either of the above described embodiments, use of blow drying means may further be employed, such as an air hose 80 connected to a compressor or other air supply source for delivering a flow of air through the air hose 80. The process of blowing the cleaning solution from the articles will result in droplets being thrown into the negative pressure envelope 33 and subsequently through the hood 20 and vapor converting unit 32.

While the instant invention has been shown and described in what is considered to be preferred and practical embodiments thereof, it is recognized that departures may be made within the spirit and scope of the present invention which, therefore, should not be limited except as defined by the following claims and within the doctrine of equivalents.

Now that the invention has been described,

What is claimed is:

1. An apparatus for recovering vapors from a volatile solvent used in industrial washing equipment of the type including a wash area for washing various articles therein and at least one holding tank for containing the solvent;

said apparatus including:
   a hood supported in spaced relation to the wash area,
   fan means mounted to said hood for creating and maintaining an envelope of negative pressure between said wash area and said hood, causing the vapors rising from said wash area to be drawn to said hood,
   means in said hood for converting the vapors drawn therein to a liquid state to yield pure solvent and including impaction means, said impaction means including an impeller and an impaction surface spaced radially from said impeller, said impeller being structured and disposed to draw the vapors through a center thereof and to direct the vapors tangentially outward therefrom for subsequent impaction against said impaction surface to create droplets of said pure solvent, and
   means for collecting said pure solvent for subsequent use.

2. An apparatus as recited in claim 1 wherein said means for converting the vapors includes cooling means for cooling the vapors to cause condensation thereof.

3. An apparatus as recited in claim 2 wherein said cooling means includes a compressor.

4. An apparatus as recited in claim 1 wherein said means for collecting said pure solvent includes coalescing means for gathering fine droplets of said pure solvent.

5. An apparatus as recited in claim 4 further including return means for directing said pure solvent from said coalescing means to the at least one holding tank of the washing equipment.

6. An apparatus as recited in claim 1 wherein said hood is hingedly mounted to the washing equipment and is movable between a closed position, in covering relation to the wash area, and an open, operative position to expose and permit access to the wash area.

7. An apparatus as recited in claim 1 wherein said hood is mounted in covering relation to the wash area and includes means for accessing said wash area.

8. An apparatus for recovering vapors from a volatile solvent used in industrial washing equipment of the type including a wash area for washing various articles therein and at least one holding tank for containing the solvent;

said apparatus including:
- a hood hingedly supported in spaced relation to the wash area, and being movable between a closed position, in covering relation to the wash area, and an open, operative position to expose and permit access to the wash area,
- a unit on said hood including:
  - a motor;
  - an impeller driven by said motor and being structured and disposed on said hood to create an envelope of negative pressure above the wash area, causing vapors to be drawn to said hood and within said unit;
  - a surface spaced radially outward from said impeller;
  - said impeller being structured to direct said vapors drawn into said unit against said surface at a velocity sufficient to cause droplets of pure liquid solvent to be separated from said vapors by impaction;
  - a coalescer for gathering the droplets of pure liquid solvent; and
  - means for returning the gathered purified liquid solvent to the washing equipment for subsequent use during washing operations.

9. An apparatus as recited in claim 8 further including means for cooling said surface spaced radially outward from said impeller.

* * * * *